US012720397B2

(12) United States Patent
McCullough

(10) Patent No.: US 12,720,397 B2

(45) Date of Patent: Aug. 25, 2026

(54) SYSTEM AND METHOD TO MANAGE AND PROVIDE WIRELESS TETHERING

(71) Applicant: Charter Communications Operating, LLC, St. Louis, MO (US)

(72) Inventor: Taren G. McCullough, Plymouth, MN (US)

(73) Assignee: Charter Communications Operating, LLC, St. Louis, MO (US)

( * ) Notice: Subject to any disclaimer, the term of this patent is extended or adjusted under 35 U.S.C. 154(b) by 278 days.

(21) Appl. No.: 18/379,273

(22) Filed: Oct. 12, 2023

(65) Prior Publication Data

US 2025/0126538 A1 Apr. 17, 2025

(51) Int. Cl.

*H04W 36/32* (2009.01)
*H04W 36/00* (2009.01)
*H04W 36/30* (2009.01)

(52) U.S. Cl.

CPC ....... *H04W 36/322* (2023.05); *H04W 36/033* (2023.05); *H04W 36/304* (2023.05)

(58) Field of Classification Search

CPC ..... H04W 88/06; H04W 76/10; H04W 88/04; H04W 52/24

See application file for complete search history.

(56) References Cited

U.S. PATENT DOCUMENTS 9,357,467 B1 * 5/2016 Bartlett ............. H04W 36/0058
10,412,633 B1 9/2019 Kotecha et al.
2002/0009060 A1 1/2002 Gross
2004/0008724 A1 1/2004 Devine et al.
2005/0105559 A1 5/2005 Cain et al.
2016/0127883 A1 5/2016 Zhou et al.
2016/0277974 A1 * 9/2016 Persson ................. H04W 48/16
2016/0335876 A1 11/2016 Verma
2017/0156090 A1 6/2017 Bhumkar et al.
2017/0181038 A1 6/2017 Yeddala et al.
2017/0196044 A1 7/2017 Nord et al.
2018/0124693 A1 5/2018 Ringland et al.
2018/0199274 A1 7/2018 Krishnan et al.
2019/0182763 A1 6/2019 Geller
2022/0369406 A1 * 11/2022 Telang .................. H04W 76/18
2023/0362711 A1 * 11/2023 Bang ..................... H04W 12/50
2024/0138009 A1 * 4/2024 Habu ..................... H04W 8/183
2025/0081073 A1 * 3/2025 Shrivastava .... H04W 36/00835

FOREIGN PATENT DOCUMENTS

EP 3343962 A1 * 7/2018 ............ H04W 88/04

* cited by examiner

*Primary Examiner* — Shukri Taha

(74) *Attorney, Agent, or Firm* — Armis IP Law, LLC

(57) ABSTRACT

A wireless access point receives a first report from a first wireless communication device. Via a report from the first wireless communication device, the wireless access point detects a condition in which a second communication device resides within a region of wireless coverage provided by the first wireless communication device. In response to detecting that the second wireless communication device resides outside a region of wireless coverage provided by the wireless access point and resides within the region of wireless coverage provided by the first wireless communication device, the wireless access point notifies the first wireless communication device to operate in a tethering mode. In the tethering mode, the first wireless communication device provides the second wireless communication device connectivity through the first wireless communication device to the wireless access point.

32 Claims, 12 Drawing Sheets

YYYY
M.C.D.
121

REPORT
R1

UIV: XXX1 WAP 131 ........P1-1 (-55 dBm)
XYZZ MCD2 ..............P1-2 (-54 dBm)
XYZ1 MCD3 ..............P1-3 (-62 dBm)

FIG. 4

XYZ1

M.C.D.
123

REPORT
R3

UIV: XXX1 WAP 131 ..........P3-1 (-56 dBm)

XYZZ MCD2 ..............P3-2 (-59dBm)

YYYY MCD1 ..............P3-3 (-61dBm)

WAP
131

REPORT
RWAP1

MCD1 ............PW-1 (-59 dBm)

MCD3 ............PW-3 (-59 dBm)

SYSTEM AND METHOD TO MANAGE AND PROVIDE WIRELESS TETHERING

BACKGROUND

A conventional Wireless Access Point (WAP) currently provides coverage to customer premises through the use of internal radios, amplifiers, and antennas. Clients connect to the WAP and are then provided wireless access to a remote network as long as they are within a wireless coverage area. A power output of the WAP is limited by the FCC (Federal Communication Commission) for health and interference reasons.

Medium to larger homes experience coverage issues at the cell edge due to signal attenuation through walls, furniture, appliances, etc.

A conventional solution to increase the coverage of a WAP is to implement an extender in a respective subscriber domain. In general, the extender increases an amount of wireless coverage provided in a subscriber domain, allowing clients to connect to the extender to the main wireless access point. In a downlink direction, the wireless access point communicates client data through the extender to the target client. In an uplink direction, the extender receives data packets from the client and forwards them to the wireless access point.

Modern mobile devices can be configured to set up a Wi-Fi™ interface and broadcast an ad-hoc Wi-Fi™ SSID used to share the mobile device's internet Wi-Fi™ access with other devices within range. In such an instance, the primary communication device setting up the wireless interface provides a second communication device access to a network through the first communication device. This feature is referred to as a personal hotspot, or tethering by the first communication device.

Several forms of conventional tethering exist to include wireless tethering such as using a wireless Wi-Fi™ standard. Alternatively, conventional techniques include wired tethering such as implementation of a physical cable (adapter) to directly connect to the second communication device to the first communication device.

BRIEF DESCRIPTION OF EMBODIMENTS

There are deficiencies associated with conventional techniques of managing implementation of tethering by communication devices in a wireless network environment. For example, with the FCC limitations on wireless access point output power, there is no other choice other than adding another piece of equipment (Extender) to increase the coverage of the ecosystem.

The limitations of conventional extenders include: i) cost to manufacture and deploy extender wireless stations, ii) increase in customer power consumption, iii) increase in complexity to a respective wireless network, iv) shared radios for client access and backhaul may result in decreased radio efficiency by up to 50%, and v) static placement of extender wireless stations may create a static cell edge, which still might have coverage issues due to placement.

Examples herein provide an improved way of implementing tethering and controlling access to a remote network.

More specifically, in one example, a wireless access point receives a first report from a first wireless communication device (a.k.a., mobile communication device) residing in a first region of wireless coverage provided by the wireless access point. Via the first report, the wireless access point detects a condition in which a second communication device (a.k.a., mobile communication device) resides within a second region of wireless coverage provided by the first wireless communication device. In response to detecting that the second wireless communication device resides outside the first region of wireless coverage and within the second region of wireless coverage, the wireless access point or other suitable entity notifies the first wireless communication device to operate in a tethering mode.

In further examples, operation of the first wireless communication device in the tethering mode includes the first wireless communication device providing the second wireless communication device connectivity through the first wireless communication device to the wireless access point.

Still further, via a first wireless communication link established between the wireless access point and the first wireless communication device, the first wireless communication device provides the second wireless communication device access through the first wireless communication device and the wireless access point to a remote network. The wireless access point can be configured to transmit an encapsulated wireless communication over the first wireless communication link to the first wireless communication device. The wireless communication may include a first data packet targeted for delivery to the second wireless communication device. The first data packet may be encapsulated by the wireless access point to include first network address information associated with the first wireless communication device for delivery of the encapsulated communication to the first wireless communication device.

In accordance with further examples as discussed herein, the first report can be configured to indicate a wireless power level at which the first wireless communication device receives a wireless signal from the second wireless communication device. The wireless access point or other suitable entity compares the wireless power level of the wireless signal received from the second wireless communication device to a wireless power threshold level. The wireless access point notifies the first wireless communication device to operate in the tethering mode in response to detecting that the wireless power level is greater than the wireless power threshold level.

Yet further examples as discussed herein include the wireless access point or other suitable entity communicating an identity of a wireless network supported by the wireless access point to the first wireless communication device. The first wireless communication device is operative to wirelessly transmit the identity of the wireless network received from the wireless access point in a wireless communication during operation of the first wireless communication device in the tethering mode.

In accordance with further examples, the first report received from the first wireless communication device can be configured to include a unique identifier value assigned to the second wireless communication device. Via the unique identifier value assigned to the second wireless communication device, the wireless access point verifies that the second wireless communication device is entitled to use wireless services provided by the wireless access point.

Yet further examples as discussed herein include the wireless access point receiving a unique identifier value assigned to the second wireless communication device. The wireless access point notifies the first wireless communication device to operate in the tethering mode based at least in part on detecting that the second wireless communication device belongs to a wireless network supported by the wireless access point as determined by the communication management resource based on the received unique identifier value.

Still further examples as discussed herein include the wireless access point receiving the first report in response to the wireless access point communicating a request for the first report to the first wireless communication device.

Note further that the second wireless communication device may move throughout a respective network environment. In response to the wireless access point detecting movement of the second wireless communication device into the first region of wireless coverage supported by the wireless access point, the wireless access point or other suitable entity initiates a handoff of the second wireless communication device from the first wireless communication device to the wireless access point.

Further examples as discussed herein include the first wireless communication device. The first wireless communication device produces a first report indicating that a second wireless communication device resides in a first region of wireless coverage provided by the first wireless communication device. The first wireless communication device communicates the first report from the first wireless communication device to a wireless access point. As a response to communicating the first report to the wireless access point, the first wireless communication device receives a command from the wireless access point to operate the first wireless communication device in a tethering mode.

Additionally, via operation of the first wireless communication device in the tethering mode, the first wireless communication device provides the second wireless communication device connectivity through the first wireless communication device to the wireless access point.

Note further that the first communication device can be configured to receive the command to operate in the tethering mode in response to a condition in which the second wireless communication device resides outside a region of wireless coverage provided by the wireless access point and inside the first region of wireless coverage provided by the first wireless communication device. The first wireless communication device can be configured to produce the first report to indicate a wireless power level at which the first wireless communication device receives a wireless signal from the second wireless communication device. As previously discussed, the reported wireless power level information can be used as a basis in which to determine whether or not the first wireless communication device should operate in the tethering mode.

Note that any of the resources as discussed herein can include one or more computerized devices, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium, computer readable hardware storage, etc., on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, examples herein are directed to a method, system, computer program product, executable instructions, etc., that supports operations as discussed herein.

One example includes a computer readable storage medium and/or system having instructions stored thereon to facilitate control or management of communications in a network environment. The instructions, when executed by computer processor hardware, cause the computer processor hardware (such as one or more co-located or disparately processor devices) to: receive a first report from a wireless communication device residing in a first region of wireless coverage provided by the wireless access point; via the first report, detect a condition in which a second communication device resides within a second region of wireless coverage provided by the first wireless communication device; and in response to detecting that the second wireless communication device resides outside the first region of wireless coverage and within the second region of wireless coverage, notify the first wireless communication device to operate in a tethering mode.

Another example includes a computer readable storage medium and/or system having instructions stored thereon to facilitate control or management of communications in a network environment. The instructions, when executed by computer processor hardware, cause the computer processor hardware (such as one or more co-located or disparately located processor devices) to: at a first wireless communication device, produce a first report indicating that a second wireless communication device resides in a first region of wireless coverage provided by the first wireless communication device; communicate the first report from the first wireless communication device to a wireless access point; and in response to communicating the first report to the wireless access point, receive a command from the wireless access point to operate the first wireless communication device in a tethering mode.

The ordering of the steps above has been added for clarity sake. Note that any of the processing steps as discussed herein can be performed in any suitable order.

Other examples of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing improved and extended wireless services to communication devices. However, it should be noted that examples herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention (s), the reader is directed to the Detailed Description section (which is a summary of embodiments) and corresponding figures of the present disclosure as further discussed below.

BRIEF DESCRIPTION OF THE DRAWINGS

FIG. 4 is an example diagram illustrating a first neighbor communication device report generated by a first mobile communication device as described herein.

FIG. 5 is an example diagram illustrating a second neighbor communication device report generated by a second mobile communication device as described herein.

FIG. 6 is an example diagram illustrating a wireless access point generated neighbor report indicating wireless stations within a region of wireless coverage provided by the wireless access point as described herein.

Figure 1:
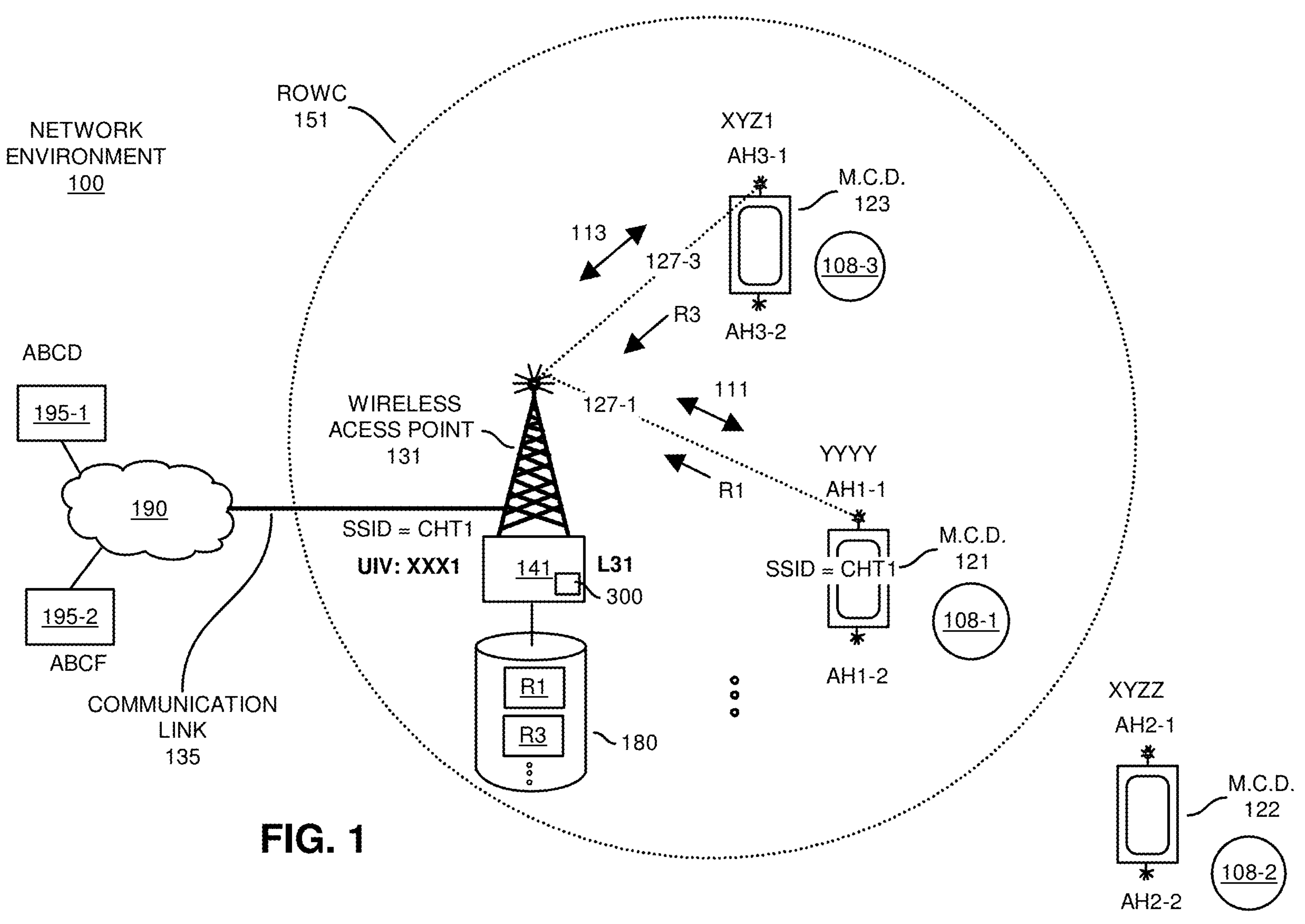
FIG. 1 is an example diagram illustrating multiple communication devices in a network environment providing reports indicating other detected wireless stations in the network environment as discussed herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

According to one configuration, communication management hardware associated with a wireless access point receives a first report from a first wireless communication device. Via the report from the first wireless communication device, the wireless access point detects a condition in which a second communication device resides within a region of wireless coverage provided by the first wireless communication device. In response to detecting that the second wireless communication device resides outside a region of wireless coverage provided by the wireless access point and resides within the region of wireless coverage provided by the first wireless communication device, the wireless access point notifies the first wireless communication device to operate in a tethering mode (extender mode of providing wireless network services associated with the wireless access point). In the tethering mode, the first wireless communication device provides the second wireless communication device wireless connectivity through the first wireless communication device to the wireless access point. The wireless access point provides the second wireless communication device connectivity to a respective remote network. Accordingly, a combination of the wireless access point and the first mobile communication device can be configured to provide the second mobile communication device connectivity to a respective remote network during a condition in which the second wireless communication devices disposed outside the region of wireless coverage provided by the wireless access point.

Now, more specifically, FIG. 1 is an example diagram illustrating multiple communication devices in a network environment providing neighbor reports indicating presence of other detected wireless stations in the network environment as discussed herein.

As shown in this example, network environment 100 includes server resource 195-1, server resource 195-2, etc., network 190, wireless access point 131, communication management resource 141, mobile communication device 121, mobile communication device 122, mobile communication device 123, etc. Communication link 135 provides connectivity between the wireless access point 131 and the remote network 190.

The mobile communication device 121 is operated by the user 108-1 and is assigned the unique identifier value or network address YYYY. The mobile communication device 121 includes antenna hardware AH1-1 and antenna hardware AH1-2. The antenna hardware AH1-1 supports wireless communication link 127-1 between the wireless access point 131 and the mobile communication device 121. The wireless communication link 127-1 supports conveyance of corresponding communications 111 between the mobile communication device 121 and the wireless access point 131. The second antenna hardware AH1-2 can be used to support a respective tethering mode with other communication devices disposed outside the region of wireless coverage 151 as further discussed herein.

The mobile communication device 122 is operated by the user 108-2 and is assigned the network address XYZZ. The mobile communication device 122 includes antenna hardware AH2-1 and antenna hardware AH2-2.

The mobile communication device 123 is operated by the user 108-3 and is assigned the network address XYY1. The mobile communication device 123 includes antenna hardware AH3-1 and antenna hardware AH3-2. The antenna hardware AH3-1 supports wireless communication link 127-3 between the wireless access point 131 and the mobile communication device 123. The wireless communication link 127-3 supports conveyance of corresponding communications 113 between the mobile communication device 123 and the wireless access point 131. The second antenna hardware AH3-2 can be used to support a respective tethering mode with other communication devices disposed outside the region of wireless coverage 151 as further discussed herein.

Note that each of the resources (such as gateway, wireless stations, communication devices, communication management resources, etc.) in network environment 100 can be configured to include appropriate hardware, software, or combination of hardware and software to carry out respective operations as discussed herein.

More specifically, the communication management resource 141 can be configured as communication management hardware, communication management software, or a combination of communication management hardware and communication management software; the wireless access point 131 can be configured as wireless access point hardware, wireless access point software, or a combination of wireless access point hardware and wireless access point software; mobile communication device 121 can be configured as communication device hardware, communication device software, or a combination of communication device hardware and communication device software; mobile communication device 122 can be configured as communication device hardware, communication device software, or a combination of communication device hardware and communication device software; communication device 123 can be configured as communication device hardware, communication device software, or a combination of communication device hardware and communication device software; and so on.

As shown in this example, the mobile communication device 121 and the mobile communication device 123 reside within the region of wireless coverage 151 provided by the wireless access point 131. In such an instance, the wireless access point 131 is able to wirelessly communicate with each of the mobile communication device 121 and the mobile communication device 123.

As previously discussed, the wireless communication link 127-1 between the wireless access point 131 and the mobile communication device 121 supports conveyance of communications 111. In the uplink direction, the mobile communication device 121 communicates over the wireless communication link 127-1 to the wireless access point 131. The wireless access point 131 forwards the corresponding uplink communications over the communication link 135 and network 190 to an appropriate target destination. In the downlink direction, the wireless access point 131 receives communications destined for delivery to the mobile communication device 121 from a resource through the network 190 and communication link 135. The wireless access point forwards the corresponding downlink communications over the wireless communication link 127-1 to the mobile communication device 121.

The wireless communication link 127-3 between the wireless access point 131 and the mobile communication device 123 supports conveyance of communications 113. In the uplink direction, the mobile communication device 123 communicates over the wireless communication link 127-3 to the wireless access point 131. The wireless access point 131 forwards the corresponding uplink communications over the communication link 135 and network 190 to an appropriate target destination. In the downlink direction, the wireless access point 131 receives communications destined for the communication device 123 from a resource through the network 190 and communication link 135. The wireless access point 131 forwards the corresponding downlink communications over the wireless communication link 127-3 to the mobile communication device 123.

The mobile communication device 122 resides outside of the region of wireless coverage provided by the wireless access point 131. In such an instance, the wireless access point 131 is not able to provide the mobile communication device 122 wireless access through the wireless access point 131 to the remote network 190 and corresponding resources 195-1, 195-2, etc.

Figure 2:
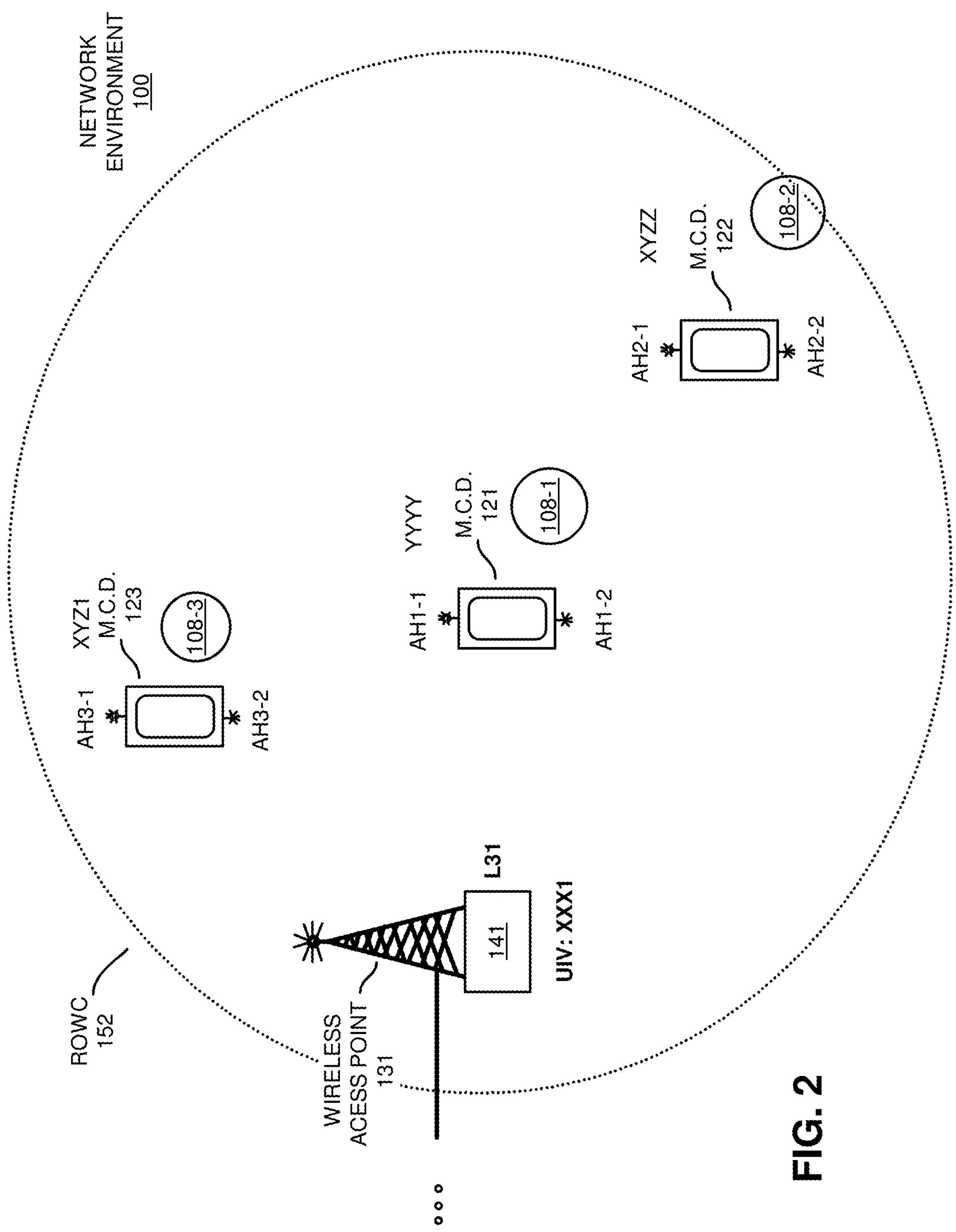
FIG. 2 is an example diagram illustrating a second mobile communication device within a region of wireless coverage provided by a first mobile communication device as described herein.

FIG. 2 is an example diagram illustrating a second mobile communication device within a region of wireless coverage provided by a first mobile communication device as described herein.

In this example, the mobile communication device 121 supports a corresponding region of wireless coverage 152 in the network environment 100. In such an instance, the mobile communication device 121 is able to communicate with any of the communication resources such as the wireless access point 131, mobile communication device 123, mobile communication device 122, etc.

Referring again to FIG. 1, the communication management resource 141 (such as a controller or other suitable entity) implements corresponding control function 300 configured to control wireless network access associated with each of the mobile communication devices.

Figure 3:
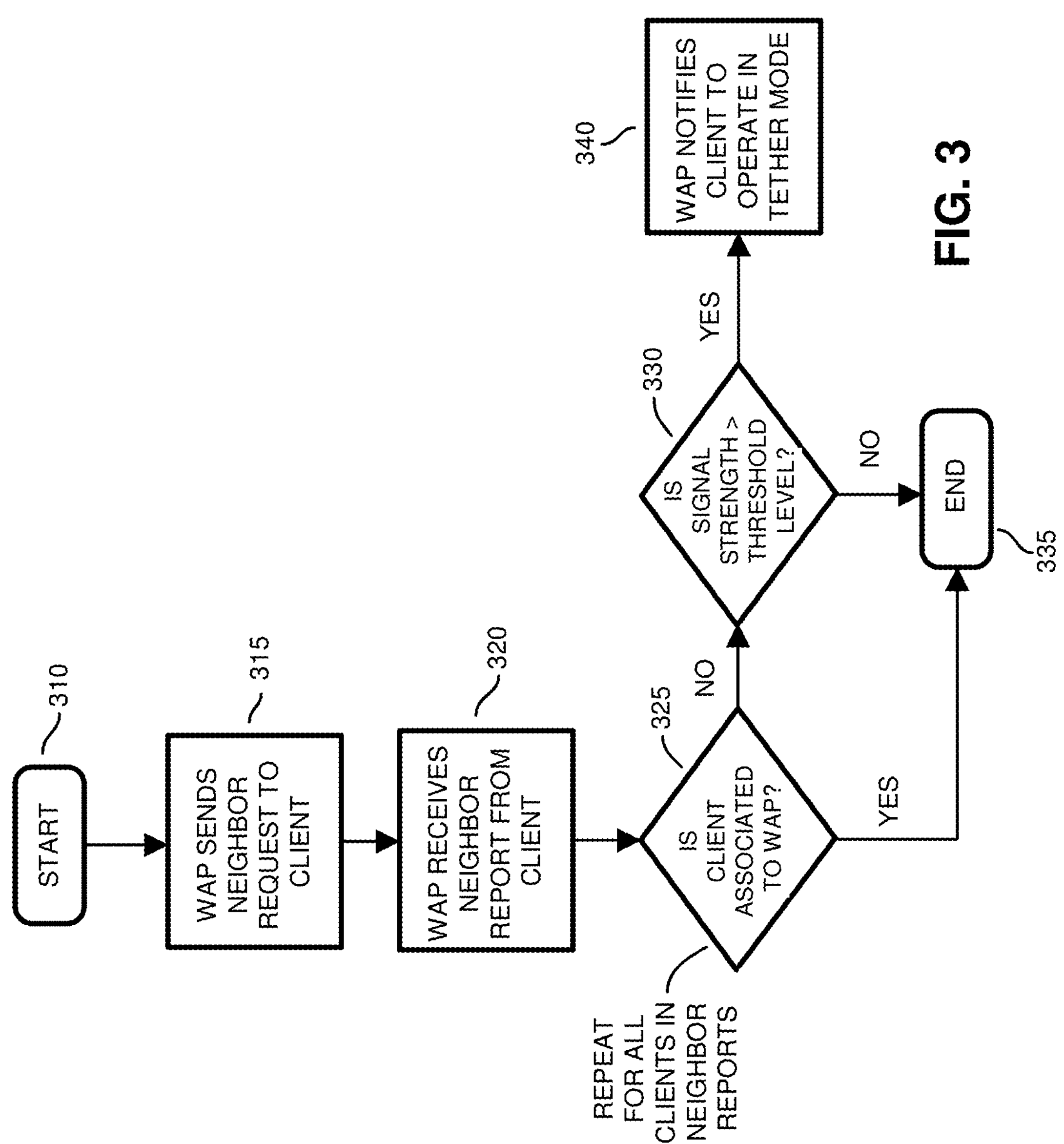
FIG. 3 is an example flow chart illustrating collection of neighbor communication device reports and use of same to control operation of the first mobile communication device in a tethering mode as described herein.

FIG. 3 is an example flow chart illustrating collection of neighbor communication device reports and use of same to control operation of the first mobile communication device in the tethering mode as described herein.

In this example, the communication management resource 141 initiates start of the control function 300 in operation 310.

In processing operation 315, the communication management resource 141 initiates transmission of a neighbor report request to each of the mobile communication devices in the region of wireless coverage 151 and which are connected to the wireless access point 131. In other words, in one example, the communication management resource 141 keeps track of the different mobile communication devices currently in wireless communication with the wireless access point 131.

Figure 6:
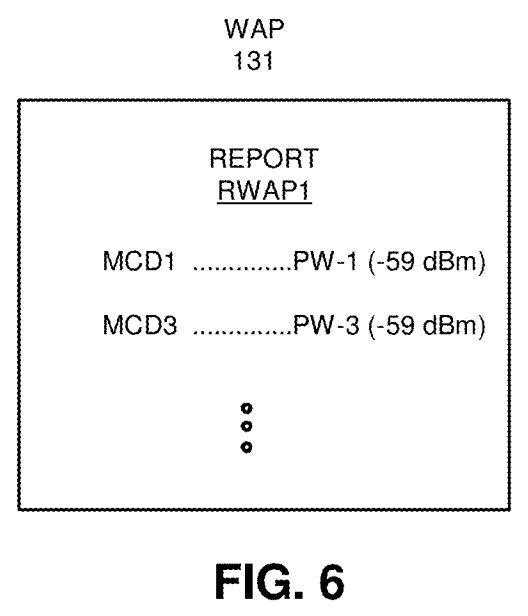

FIG. 6 is an example diagram of a neighbor report RWAP1 generated by the wireless access point 131 indicating which of the multiple mobile communication devices in the network environment 100 are currently in communication with or present in the region of wireless coverage 151 associated with the wireless access point 131. If desired, the wireless access point 131 and corresponding communication management resource 141 can be configured to generate the corresponding neighbor report RWAP1 indicating a respective power level at which the wireless access point 131 receives wireless communications from each of the mobile communication devices in the region of wireless coverage 151.

Referring again to FIG. 3, in furtherance of learning neighbor communication devices outside of the region of wireless coverage 151, but within respective regions of wireless coverage of other mobile communication devices in the network environment 100, the communication management resource 141 sends a respective neighbor report request to each of those mobile communication devices such as mobile communication device 121 (a.k.a., MCD1), mobile communication device 123 (a.k.a., MCD2), etc. The neighbor report request prompts each of the mobile communication devices 121, 122, etc., receiving the respective request to provide feedback indicating which of multiple mobile communication devices are within range of that corresponding mobile communication device.

Because the mobile communication devices may move about the network environment 100, the communication management resource 141 and corresponding wireless access point 131 can be configured to repeatedly send out the neighbor report requests to the mobile communication devices within the range of wireless coverage 151. In this way, the communication management resource 141 is aware of the current connectivity in the network environment 100 as well as those communication devices present in the region of wireless coverage 151. If desired, the mobile communication devices can be configured to provide location information indicating their respective location. The communication management resource 141 can be configured to use the location information of each of the mobile communication devices as a basis in which to determine which of the mobile communication devices are within the region of wireless coverage 151 and those that are just outside the region of wireless coverage 151.

As a more specific example of generating neighbor report requests, in processing operation 315, the communication management resource 141 transmits a first neighbor report request over the wireless communication link 127-1 to the mobile communication device 121. In response to receiving the neighbor report request via communications 111, the mobile communication device 121 generates and transmits a respective report R1 over the wireless communication link 127-1 to the wireless access point 131 and corresponding communication management resource 141. The communication management resource 141 stores the received report R1 in the repository 180.

Figure 4:
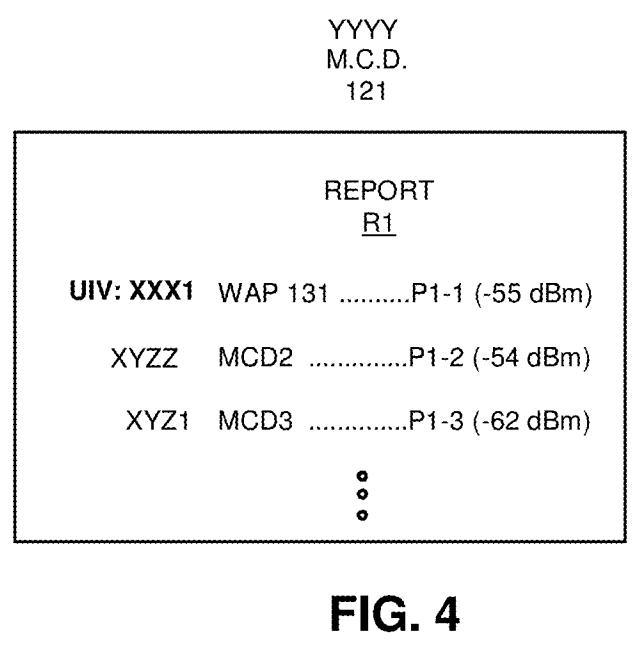

FIG. 4 is an example diagram illustrating a first neighbor communication device report generated by a first mobile communication device as described herein.

In this example, in response to receiving a respective neighbor request inquiry, or simply because the mobile communication device 121 is configured to provide neighbor reports back to the wireless base station 131 on a periodic or occasional basis, the communication device 121 listens for presence of other communication devices in its region of wireless coverage 152. In this example, the mobile communication device 121 receives wireless signals from the wireless stations including wireless access point 131, mobile communication device 122, and mobile communication device 123.

As further shown, the mobile communication device 121 can be configured to monitor a respective power level at which the mobile communication device 121 receives wireless communications from each of the other wireless stations (such as wireless access point 131, mobile communication device 122, mobile communication device 123, etc.). The mobile communication device 121 can be configured to monitor for presence of the wireless signals from other communication devices using any suitable antenna hardware such as antenna hardware AH1-1, AH1-2, etc.

In this example, assume that: i) the mobile communication device 121 receives wireless signals from the wireless access point 131 at received wireless power level P1-1 (such as −55 dBm); ii) the mobile communication device 121 receives wireless signals from the mobile communication device 122 (MCD2) at received wireless power level P1-2 (such as −54 dBm); iii) the mobile communication device 121 receives wireless signals from the mobile communication device 123 (MCD3) at received wireless power level P1-3; and so on.

As shown in FIG. 4, the mobile communication device 121 generates the neighbor report R1 to indicate the different signal strengths at which the communication device 121 receives wireless signals from the other wireless stations. The mobile communication device 121 can be configured to determine which of the wireless stations in the network environment transmits respective wireless signals based upon a network address in the received wireless signals.

For example, mobile communication device 121 is able to determine wireless signals transmitted from the wireless access point 131 based upon a unique identifier value XXX1 in the corresponding received communications from the wireless access point 131; mobile communication device 121 is able to determine wireless signals transmitted from the mobile communication device 122 based upon a unique identifier value XYZZ in the corresponding received communications from the mobile communication device 122; mobile communication device 121 is able to determine wireless signals transmitted from the mobile communication device 123 based upon a unique identifier value XYZ1 in the corresponding received wireless communications from the mobile communication device 123; and so on.

Note that reception of wireless signals at a received wireless power level of greater than −60 dBm is a fairly good signal strength to support wireless communications. More specifically, −30 dBm is typically a maximum possible signal strength; −50 dBm is considered an excellent signal strength; −60 dBm is a moderate good signal strength; −67 dBm is a poor signal strength level; −70 dBm is a very poor signal strength; etc.

As previously discussed, the communication device 121 transmits the respective neighbor report R1 to wireless access point 131 and corresponding communication management resource 141. Accordingly, via the report R1, the mobile communication device 121 provides notification to the wireless access point and corresponding communication management resource 141 that the mobile communication device 121 is able to provide a fairly good wireless communication link to the mobile communication device 122.

In one example, the first report R1 received from the first wireless communication device 121 includes a unique identifier value XYZZ assigned to the second wireless communication device 122. Via the unique identifier value XXYZ assigned to the second wireless communication device 122, the communication management resource 141 and corresponding wireless access point 131 verify that the second wireless communication device 122 is entitled to use wireless services provided by the wireless access point 131. In other words, via the report R1, the communication management resource 141 learns of one or more communication devices (such as communication device 122) that are respective wireless subscribers that reside outside of the region of wireless coverage 151. The communication management resource 141 desires to provide wireless connectivity to all of its subscribers including corresponding mobile communication device 122 and the user 108-2.

In response to detecting that the mobile communication device 122 is a subscriber and outside of the region of wireless coverage 151, the wireless access point 131 and corresponding communication management resource 141 can be configured to communicate with and operate the mobile communication device 121 in a tethering mode, resulting in the mobile communication device 121 acting as a respective extender in which the mobile communication device 121 provides the corresponding mobile communication device 122 wireless access through the mobile communication device 121 to the wireless access point 131. In such an instance, the mobile communication device 122 may not be aware of the availability of the wireless access point 131 because the mobile communication device 122 resides outside the region of wireless coverage 151. However, because the mobile communication device 121 generates and transmits a corresponding network availability message to the mobile communication device 122 from the antenna hardware AH1-2, the mobile communication device 122 is made aware of the availability of the wireless service provided by the wireless access point 131 as well as the ability of the mobile communication device 122 to connect to the wireless access point 131 through the mobile communication device 121.

Referring again to FIG. 3, in processing operation 315, the communication management resource 141 also initiates transmission of a neighbor report request to the mobile communication device 123. For example, the communication management resource 141 transmits a neighbor report request over the wireless communication link 127-3 to the mobile communication device 123. In response to receiving the neighbor report request via communications 113, the mobile communication device 123 generates and transmits a respective report R3 over the wireless communication link 127-3 to the wireless access point 131 and corresponding communication management resource 141. The communication management resource 141 stores the received report R3 in the repository 180.

The communication management resource 141 repeats this process for each mobile communication device wirelessly connected to the wireless access point 131 to determine which, if any, mobile communication devices (subscribers) in the network environment 100 are present outside of the region of wireless coverage 151.

Figure 5:
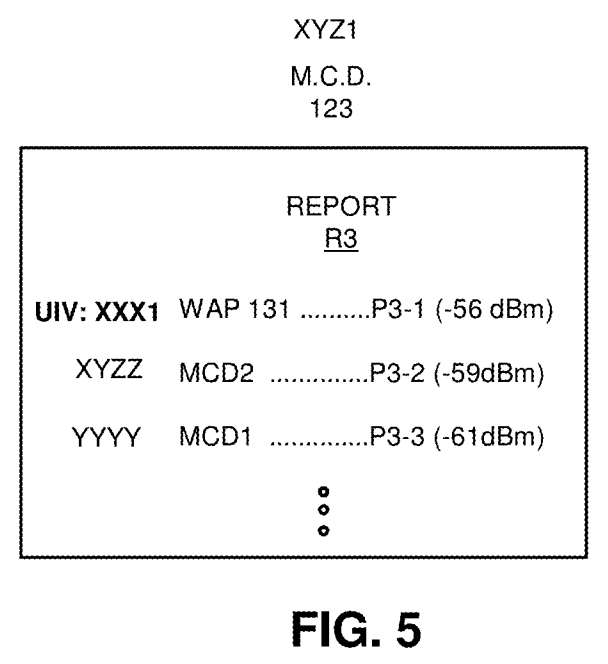

FIG. 5 is an example diagram illustrating a second neighbor communication device report generated by a second mobile communication device as described herein.

In this example, in response to receiving a respective neighbor request inquiry from the wireless access point 131, or simply because the mobile communication device 123 is configured to provide neighbor reports back to the wireless base station 131 on a periodic or occasional basis, the communication device 123 listens for presence of other communication devices in its corresponding region of wireless coverage. In this example, the mobile communication device 123 receives wireless signals from the wireless stations including wireless access point 131, mobile communication device 121, and mobile communication device 123.

As further shown, the mobile communication device 123 can be configured to monitor a respective power level at which the mobile communication device 123 receives wireless communications from each of the other wireless stations (wireless access point 131, mobile communication device 121, mobile communication device 122, etc.). The mobile communication device 123 can be configured to monitor for presence of the wireless signals from other communication devices using any suitable antenna hardware such as antenna hardware AH3-1, AH3-2, etc.

In this example, assume that: i) the mobile communication device 123 receives wireless signals from the wireless access point 131 at received wireless power level P3-1 (such as −56 dBm); ii) the mobile communication device 123 receives wireless signals from the mobile communication device 122 (MCD2) at received wireless power level P3-2 (such as −59 dBm); iii) the mobile communication device 123 receives wireless signals from the mobile communication device 121 (MCD1) at received wireless power level P3-3 (such as −61 dBm); and so on.

As shown in FIG. 5, the mobile communication device 123 generates the neighbor report R3 to indicate the different signal strengths at which the communication device 123 receives wireless signals from the other wireless stations. The mobile communication device 123 can be configured to determine which of the wireless stations in the network environment transmits respective wireless signals based upon a network address in the received wireless signals.

For example, mobile communication device 123 is able to determine wireless signals transmitted from the wireless access point 131 based upon a unique identifier value XXX1 in the corresponding received communications from the wireless access point 131; mobile communication device 123 is able to determine wireless signals transmitted from the mobile communication device 122 based upon a unique identifier value XYZZ in the corresponding received communications from the mobile communication device 122; mobile communication device 123 is able to determine wireless signals transmitted from the mobile communication device 121 based upon a unique identifier value YYYY in the corresponding received wireless communications from the mobile communication device 122; and so on.

As previously discussed, the communication device 123 transmits the respective neighbor report R3 to the wireless access point 131 and corresponding communication management resource 141. Accordingly, via the report R3, the mobile communication device 121 provides notification to the wireless access point and corresponding communication management resource 141 that the mobile communication device 123 is able to provide a fairly good wireless communication link to the mobile communication device 122.

Referring again to FIG. 3, in processing operation 320, the wireless access point 131 and corresponding communication management resource 141 receive and process the different neighbor reports from the wireless stations in the network environment 100 as previously discussed.

As further shown, in processing operation 325, the communication management resource 141 determines which mobile communication devices (such as client devices) in the network environment 100 are currently connected with the wireless access point 131 as well as which of the mobile communication devices reside outside of the region of wireless coverage 151 but are within wireless range of the corresponding mobile communication device in communication with the wireless access point 131.

For example, in processing operation 325, based upon the report RWAP1 (FIG. 6), the communication management resource 141 determines that the mobile communication device 121 and mobile communication device 123 are provided good wireless service through the wireless access point 131 based upon good signal strength associated with wireless communication link 127-1 and wireless communication link 127-3. In such an instance, the communication management resource 141 executes processing operation 335 for mobile communication device 121 and mobile communication device 123 because they are any provided good wireless service.

Additionally, in processing operation 325, via the reports received from the mobile communication device 121 and the mobile communication device 122, the communication management resource 141 determines that the mobile communication device 122 (XYZZ) operated by the user 108-2 subscribes to services provided by the wireless access point 131. Additionally, via the corresponding reports, the communication management resource 141 determines that the mobile communication device 122 resides outside the region of wireless coverage 151. The communication management resource 141 can be configured to determine that the user 108-2 operating the communication device 122 is a subscriber based on a corresponding unique identifier value such as network address XYZZ as received from the report R1 generated by mobile communication device 121.

As further shown in flowchart 300 the FIG. 3, the communication management resource executes processing operation 330 to determine which of the one or more mobile communication devices in the network environment 100 are good candidates in which to operate in a tethering mode in which the respective mobile communication device provides wireless connectivity to the mobile communication device residing outside the region wireless coverage 151.

More specifically, in response to detecting that the mobile communication device 122 and corresponding user 108-2 reside outside the region wireless coverage 151 based on respective reports, the communication management resource 141 analyzes the received reports and determines from the received neighbor reports that the mobile communication device 122 resides in the corresponding region of wireless coverage 152 as well as a corresponding region of wireless coverage provided by the mobile communication device 123. In such an instance, one or both of the mobile communication device 121 and mobile communication device 123 can be operated in a respective tethering mode to provide the mobile communication device 122 wireless access through the wireless access point 131 to the remote network 190.

As a more specific example, the report R1 indicates that the mobile communication device 121 receives wireless communications from the mobile communication device 122 at a power level P1-2 of −54 dBm. The report R2 indicates that the mobile communication device 123 receives wireless communications from the mobile communication device 122 at a power level P3-2 of −59 dBm. The communication management resource 141 determines that both of the power levels P1-2 and P3-2 are less than a respective threshold level of −60 dBm. This means that either or both of the mobile communication devices 121 and 123 are able to provide a good tether wireless communication link to the mobile communication device 122.

It is noted from the corresponding power level information that the communication device 121 is able to provide a better (stronger wireless signal) communication link with the mobile communication device 122 because power level −54 is less than power level −59. In such an instance, because the communication device 121 provides better wireless connectivity, in processing operation 340, the communication management resource 141 and corresponding wireless access point 131 provide notification to the mobile communication device 121 to operate in a so-called tethering mode in which the mobile communication device 121 operates as a respective intermediary communication device conveying communications between the wireless access point 131 and the mobile communication device 122.

Thus, the wireless access point 131 and corresponding communication management resource 141 can be configured to receive a first report R1 from a first wireless communication device 121 residing in a first region of wireless coverage 151 provided by the wireless access point 131. Via the first report R1, the communication management resource 141 and corresponding wireless access point 131 detect a condition in which the mobile communication device 122 resides within a second region of wireless coverage 152 provided by the first wireless communication device 121. In response to detecting that the second wireless communication device 122 resides outside the first region of wireless coverage 151 and within the second region of wireless coverage 152, the communication management resource 141 and corresponding wireless access point 131 notify the mobile communication device 121 to operate in a respective tethering mode. In one example, as previously discussed, the communication management resource 141 compares the wireless power level −54 dBm of the communication device 121 wireless signal received from the second wireless communication device 122 to a wireless power threshold level of −60 dBm or other suitable value. The communication management resource 141 notifies the first wireless communication device 121 to operate in the tethering mode in response to detecting that the wireless power level −54 is greater than the wireless power threshold level −60. In this way, the wireless access point 131 and corresponding communication management resource 141 are able to provide wireless services to the mobile communication device 122 through the mobile communication device 121.

Operation of the first wireless communication device 121 in the tethering mode includes the first wireless communication device 121 providing the second wireless communication device 122 connectivity through the first wireless communication device 121 to the wireless access point 131. More specifically, via a first wireless communication link 127-1 established between the wireless access point and the first wireless communication device 121, the wireless access point 131 and the communication device 121 provide a second communication device 122 access through the communication device 121 and the wireless access point 131 to the remote network 190.

Figure 7:
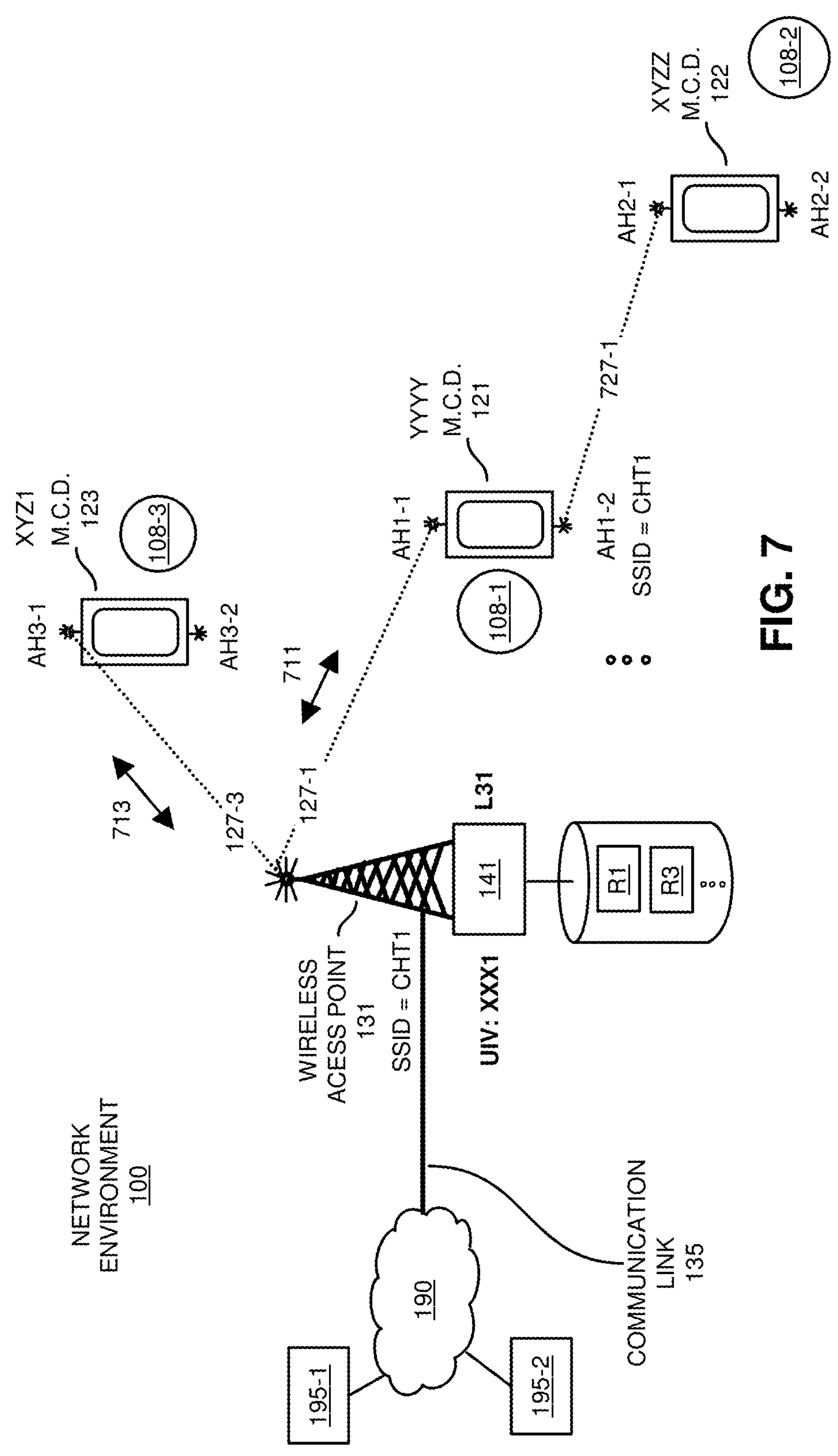
FIG. 7 is an example diagram illustrating operation of a respective first mobile communication device in a tethering mode to provide a second communication device wireless connectivity in a network environment as described herein.

An example operating in the tethering mode is shown and discussed in FIG. 7.

FIG. 7 is an example diagram illustrating operation of a respective first mobile communication device in a tethering mode to provide a second communication device wireless connectivity in a network environment as described herein.

As previously discussed, the communication management resource 141 notifies the mobile communication device 121 to operate in the so-called tethering mode. For example, via communications 711, the wireless access point 131 notifies the mobile communication device 121 to operate in a tethering mode of providing wireless services (on behalf of the wireless access point 131) to the mobile communication device 122.

In response to receiving the notification such as command from the communication management resource 141 to operate in the tethering mode, the mobile communication device 121 establishes a respective wireless communication link 727-1 between the antenna hardware AH1-2 of the mobile communication device 121 and the antenna hardware AH2-1 of the mobile communication device 122. During operation, to provide intermediary wireless services, the mobile communication device 121 can be configured to operate as a server resource with respect to the mobile communication device 122; the wireless access point 131 can be configured to operate as a server resource of the respective the mobile communication device 121.

Note that the creation of the respective wireless communication link 727-1 may include, prior to establishing wireless communication link 727-1, the mobile communication device 121 transmitting a respective wireless service availability notification from the antenna hardware AH1-2 in the corresponding region wireless coverage 152. The service beacon (wireless service availability notification from the mobile communication device 121) can be configured to indicate a respective identity (such as SSID-CHT1) of a wireless network service provided by the wireless access point 131 and the mobile communication device 121.

In one example, the wireless access point 131 communicates an identity of a wireless network (such as SSID=CHT1) supported by the wireless access point 131 to the mobile communication device 121. The mobile communication device 121 wirelessly transmits the identity of the wireless network (such as SSID=CHT1) received from the wireless access point in a wireless communication to the mobile communication device 122.

Thus, the wireless access point 131 can be configured to provide wireless notifications of the availability of the wireless network services associated with the wireless network SSID=CHT1 provided by the wireless access point 131. The mobile communication device 121 and corresponding user 108-1 as well as mobile communication device 123 and corresponding user 108-3 are subscribers associated with the wireless network CHT1. As previously discussed, the mobile communication device 122 is chosen to operate as an extender wireless access point (wireless network service extender) associated with the wireless network service provider CHT1.

Note further that the beacon generated by the mobile communication device 121 indicating the corresponding available wireless services (SSID=CHT1) can be configured to further include a respective indication that the wireless services being provided by the mobile communication device 121 are provided in accordance with a tethering mode through the mobile communication device 121 to the wireless access point 131.

In such an instance, based upon receipt of a corresponding wireless network service availability notification from the mobile communication device 121, the mobile communication device 122 learns of the availability of the wireless services associated with the wireless network (named SSID=CHT1) and corresponding wireless access point 131. Because the mobile communication device 122 subscribes to services associated with CHT1 (the wireless network service provider), the mobile communication device 122 sends a corresponding communication to the mobile communication device 121 to establish the corresponding wireless communication link 727-1 in response to the mobile communication device 122 and/or user 108-2 desiring use of respective wireless services.

Note further that the wireless access point 131 corresponding communication management resource 141 can be configured to receive a unique identifier value XYZZ assigned to the second wireless communication device. The communication management resource 141 and corresponding wireless access point 131 can be configured to notify the first wireless communication device 121 to operate in the tethering mode based at least in part on detecting that the second wireless communication device 122 belongs to a wireless network (SSID=CHT1) supported by the wireless access point 131 based on the received unique identifier value XYZZ. In other words, the communication management resource 141 can be configured to use the identifier value XYZZ assigned to the communication device 122 to determine that the communication device 122 and the corresponding user 108-2 belongs to a respective network provided by the wireless network service provider CHT1.

Subsequent to authentication of the corresponding mobile communication device 122 and corresponding user 108-2 via communications over the wireless communication link 727-1 and the wireless communication link 127-1 is wireless network services associated with the wireless network SSID=CHT1, the combination of the wireless access point 131 and the mobile communication device 121 provide the user 108-2 and corresponding mobile communication device 122 access to the remote network 190.

For example, assume that the mobile communication device 122 communicates with the server resource 195-1 in the network 190. In such an instance, the mobile communication device 122 wirelessly transmits uplink communications over the wireless communication link 727-1 to the antenna hardware AH1-2 of the mobile communication device 121. Because the mobile communication device 121 operates in the tethering mode, the mobile communication device 121 forwards the uplink communications from the antenna hardware AH1-1 over the wireless communication link 127-1 to the wireless access point 131. The wireless access point 131 further communicates the uplink communications over the communication link 135 and network 190 to the server resource 195-1.

In the downstream direction, the server resource 195-1 communicates downlink communications to the mobile communication device 122. The conveyance of the downlink communications to the mobile communication device may include conveyance of the downlink communications from the server resource 195-1 through the network 190 and communication link 135 to the wireless access point 131. The wireless access point 131 forwards the corresponding downlink communications over the wireless communication link 127-1 to the antenna hardware AH1-1 of the mobile communication device 121. The mobile communication device 121 further forwards the corresponding downlink communications from the antenna hardware AH1-2 over the wireless communication link 727-1 to the antenna hardware AH2-1 of the home communication device 122.

Figure 8:
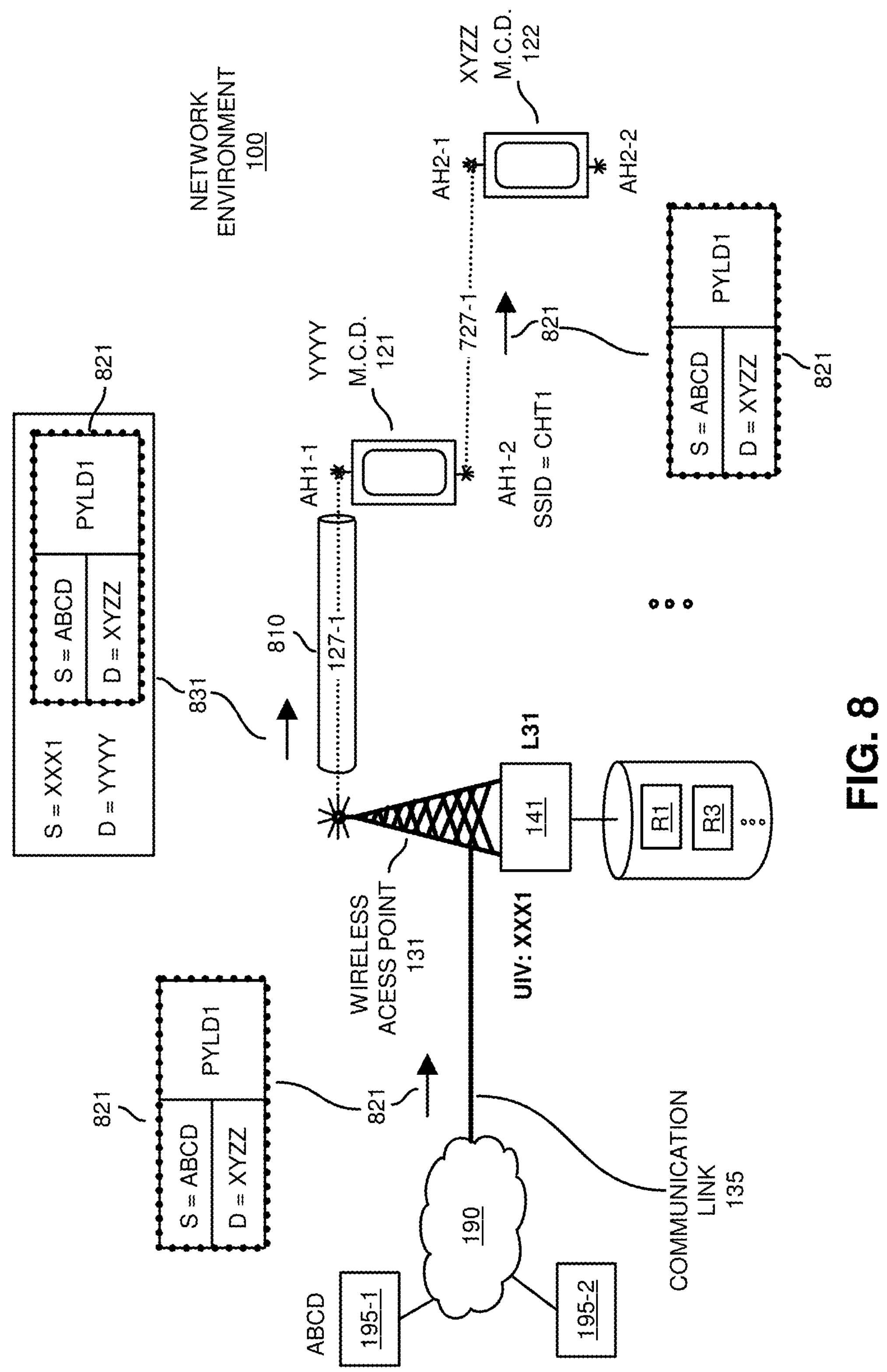
FIG. 8 is an example diagram illustrating implementation of a respective secured tunnel to provide conveyance of corresponding communications in the tethering mode as described herein.

As further discussed in FIG. 8, the communication management resource 141 can be configured to set up a corresponding tunnel between the wireless access point 131 and the mobile communication device 121 so that the corresponding uplink and downlink communications associated with the mobile communication device 122 are not discernible by eavesdropping parties. In other words, the corresponding secured tunnel prevents unwanted parties from having access to the corresponding uplink and downlink communications.

FIG. 8 is an example diagram illustrating implementation of a respective secured tunnel to provide conveyance of corresponding communications in the tethering mode as described herein.

In this example, the communication management resource 141 implements the secured tunnel 810 between the wireless access point 131 and the mobile communication device 121 to provide conveyance of secured communications.

For example, assume that the server resource 195-1 generates the corresponding downlink communications 821 for delivery to the mobile communication device 122. The communication 821 includes a corresponding source network address ABCD indicating a corresponding communication device (server resource 195-1) generating the communication 821. The communication 821 further include a corresponding destination address (XYZZ) indicating a corresponding network address to which the corresponding communication 821 is being transmitted. As further shown, the communication 821 includes a corresponding payload portion PYLD1 (such as data) destined for delivery to the mobile communication device 122.

As further shown, the wireless access point 131 receives the corresponding communication 821. Via encapsulation, the wireless access point 131 produces the corresponding communication 831 for downstream transmission over the wireless communication link 127-1 and corresponding secured tunnel to the mobile communication device 121. The wireless access point 131 and corresponding communication management resource 141 produce the encapsulated communication 831 to include the communication 821 (such as encrypted) as well as the corresponding source network address of the wireless access point 131 (XXX1) and destination network address of the mobile communication device 121 (YYYY). In such an instance, the wireless access point 131 communicates the communication 831 over the wireless communication link 127-1 and secure tunnel 810 to the mobile communication device 121.

The mobile communication device 121 is configured to remove the encapsulation associated with the communication 831 and forward the corresponding communication 821 to the destination network address XYZZ (that is, communication device 122).

Accordingly, techniques herein include implementation of a corresponding secured tunnel 810 to provide secured wireless communications in the network environment 100.

In a reverse direction, the mobile communication device 121 receives uplink communications from the mobile communication device 122 over the wireless communication link 727-1. The mobile communication device 121 can be configured to encapsulate received uplink communications and forward them over the corresponding secured tunnel 810 to the wireless access point 131. The wireless access point 131 removes the encapsulation portion of the received uplink wireless communications received and forwards the core communications over the communication link 135 and network 190 to the server resource 195-1.

Thus, the secured tunnel 810 can be configured to support both uplink and downlink communications.

Figure 9:
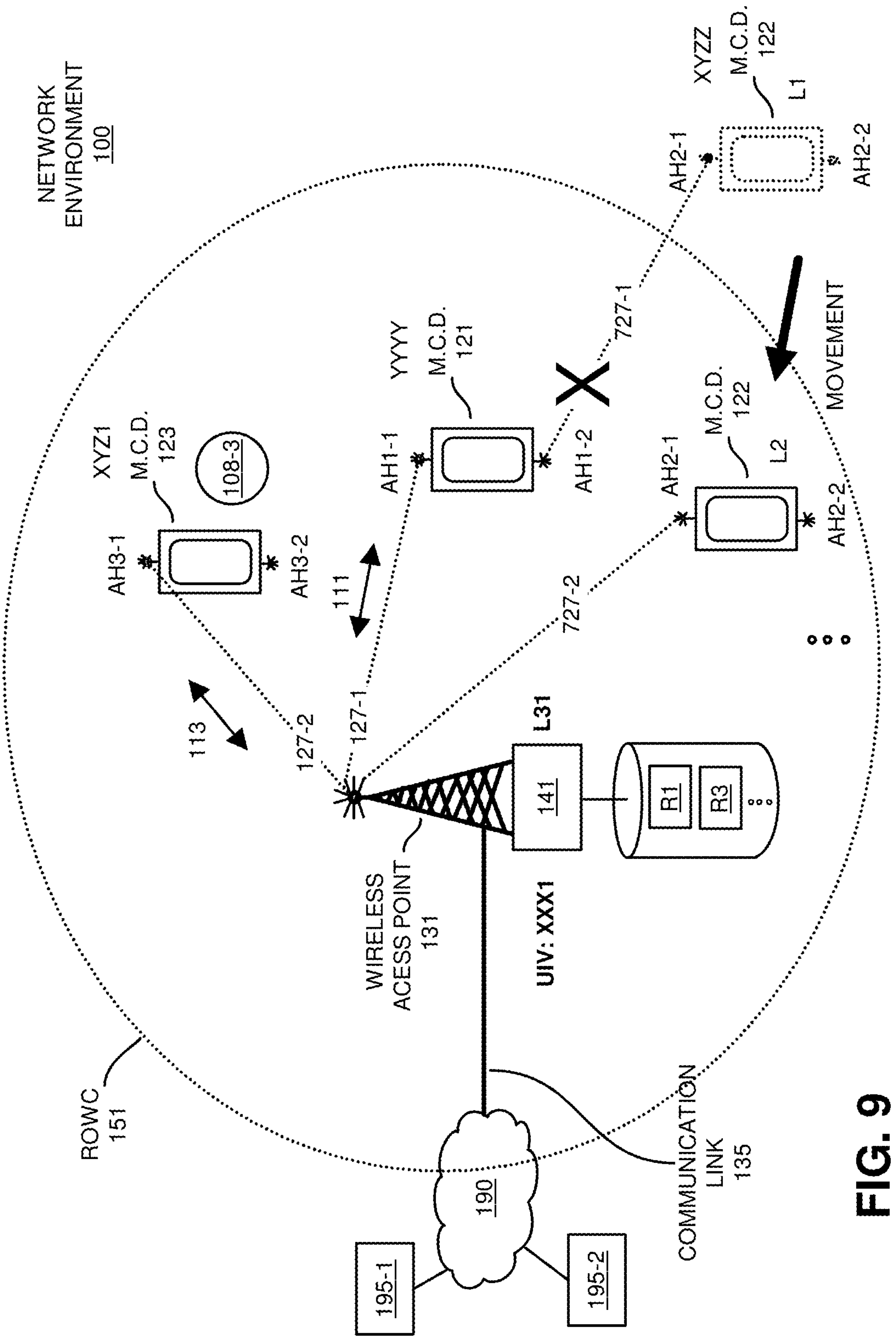
FIG. 9 is an example diagram illustrating handoff of a second mobile communication device to a wireless access point in response to detecting that the second mobile communication device moves within a region of wireless coverage provided by the wireless access point as discussed herein.

FIG. 9 is an example diagram illustrating handoff of a second mobile communication device to a wireless access point in response to detecting that the second mobile communication device moves within a region of wireless coverage provided by the wireless access point as discussed herein.

As previously discussed, the mobile communication devices may move about the network environment 100 over time. Initially, the mobile communication device 122 resides at location L1 outside of the corresponding region of wireless coverage 151 provided by the wireless access point 131. However, over time, the mobile communication device 122 moves from the location L1 to the location L2.

At location L2, the mobile communication device 122 is now within the region of wireless coverage 151 provided by the wireless access point 131.

The communication management resource 141 can be configured to detect the condition in which the mobile communication device 122 is within the region of wireless coverage 151 in any suitable manner. For example, the mobile communication device 122 can be configured to provide location information to the wireless access point 131 and corresponding communication management resource 141 that the mobile communication device 122 resides at location L2. The communication management resource 141 can be configured to determine that the location L2 is within the region of wireless coverage 151.

Alternatively, the wireless access point 131 can be configured to communicate wireless signals to the mobile communication device 122. The mobile communication device 122 may respond with reply wireless signals indicating that the mobile communication device 122 is able to communicate with the wireless access point 131. In response to the wireless access point 131 and/or the mobile communication device 122 receiving wireless signals from each other greater than the threshold level as previously discussed, the wireless access point 131 can initiate a respective handoff of the mobile communication device 122 from the mobile communication device 121 to the wireless access point 131.

Further, as previously discussed, the wireless access point 131 can be configured to feedback from one or more of the mobile communication devices in the network environment indicating which of the mobile communication devices reside within the region of wireless coverage 151. This can include the wireless access point 131 receiving and monitoring the wireless signals transmitted by the mobile communication device 122.

Assume in this example that the wireless access point 131 receives one or more signals transmitted by the antenna hardware AH2-1. Assume further that the wireless access point 131 detects that the power level of those corresponding wireless signals transmitted by the mobile communication device 122 are greater than the corresponding threshold level (such as −60 dBm). For example, assume that the wireless access point 131 receives wireless signals from the mobile communication device 122 at a wireless power level of −53 dBm (which is greater than the threshold level of −60 dBm). In such an instance, the communication management resource 141 determines that it is no longer necessary for the mobile communication device 121 to operate in the tethering mode because the mobile communication device 122 can be configured to communicate directly with the wireless access point 131 to access the corresponding remote network 190.

As further shown in FIG. 9, in response to detecting that the mobile communication device 122 resides within the region of wireless coverage 151, the communication management resource 141 initiates a respective handoff of the mobile communication device 122 from the mobile communication device 121 to the wireless access point 131. As a result of the handoff, the mobile communication device 122 and the mobile communication device 121 terminate the corresponding wireless communication link 727-1. Further, the mobile communication device 122 establishes a corresponding wireless communication link 727-2 with the wireless access point 131. Accordingly, the wireless communication link 727-2 provides the mobile communication device 122 wireless access to the remote network 190 and corresponding communication devices in the network environment 100.

Accordingly, examples herein include, in response to detecting movement of the second wireless communication device 122 into the first region of wireless coverage 151, the wireless access point 131 and corresponding communication management resource 141 initiating or causing a handoff of the second wireless communication device 122 from the first wireless communication device 121 to the wireless access point 131.

Figure 10:
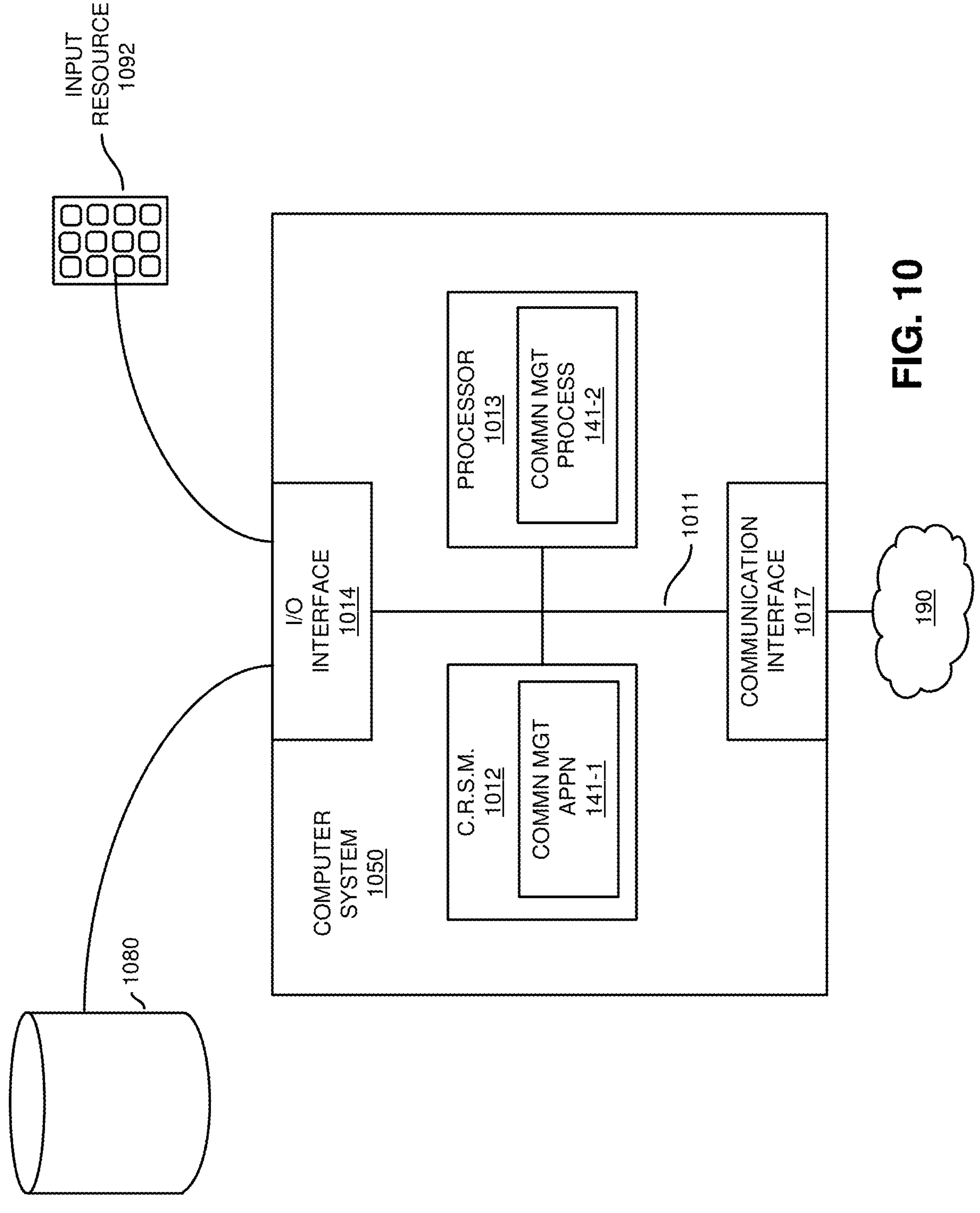
FIG. 10 is a diagram illustrating an example computer architecture to execute one or more operations as described herein.

FIG. 10 is an example block diagram of a computer system for implementing any of the operations as previously discussed according to embodiments herein.

Any of the resources (such as wireless access point 131, communication management resource 141, mobile communication device 121, mobile communication device 122, etc.) as discussed herein can be configured to include computer processor hardware and/or corresponding executable instructions to carry out the different operations as discussed herein.

As shown, computer system 1050 of the present example includes an interconnect 1011 that couples computer readable storage hardware 1012 or any suitable type of hardware storage medium in which digital information can be stored and retrieved), a processor 1013 (computer processor hardware), I/O interface 1014, and a communications interface 1017.

I/O interface(s) 1014 supports connectivity to repository 1080 and input resource 1092.

Computer readable storage medium 1012 can be any hardware storage device such as memory, optical storage, hard drive, floppy disk, etc. In one embodiment, the computer readable storage medium 1012 stores instructions and/or data.

As shown, computer readable storage media 1012 can be encoded with communication management application 140-1 (e.g., including instructions) to carry out any of the operations as discussed herein.

During operation of one embodiment, processor 1013 accesses computer readable storage media 1012 via the use of interconnect 1011 in order to launch, run, execute, interpret or otherwise perform the instructions in management application 140-1 stored on computer readable storage medium 1012. Execution of the communication management application 140-1 produces communication management process 140-2 to carry out any of the operations and/or processes as discussed herein.

Those skilled in the art will understand that the computer system 1050 can include other processes and/or software and hardware components, such as an operating system that controls allocation and use of hardware resources to execute communication management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1050 may reside at any location or can be included in any suitable resource in any network environment to implement functionality as discussed herein.

Functionality supported by the different resources will now be discussed via flowcharts in FIG. 11 and FIG. 12. Note that the steps in the flowcharts below can be executed in any suitable order.

Figure 11:
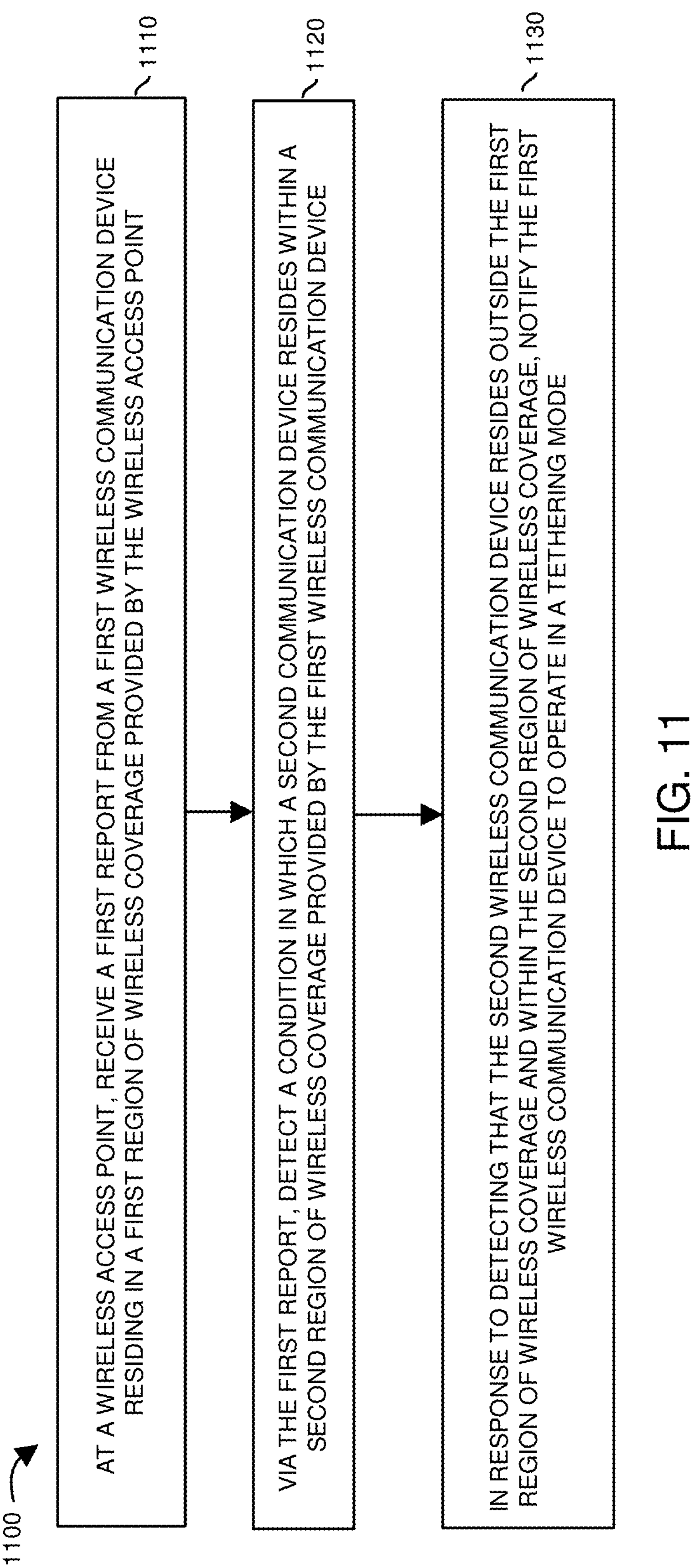
FIG. 11 is an example diagram illustrating a method as described herein.

FIG. 11 is a flowchart 1100 illustrating an example method according to embodiments. Note that there will be some overlap with respect to concepts as discussed above.

In processing operation 1110, the communication management resource 141 associated with the wireless access point 131 receives a first report R1 from the mobile communication device 121 residing in the first region of wireless coverage 151 provided by the wireless access point 131.

In processing operation 1120, via the first report R1, the communication management resource 141 detects a condition in which a second communication device resides within a second region of wireless coverage 152 provided by the first wireless communication device 121.

In processing operation 1130, in response to the communication management resource 141 detecting that the second wireless communication device 122 resides outside the first region of wireless coverage 151 and within the second region of wireless coverage 152, the communication management resource 141 notifies the communication device 121 to operate in the tethering mode.

Figure 12:
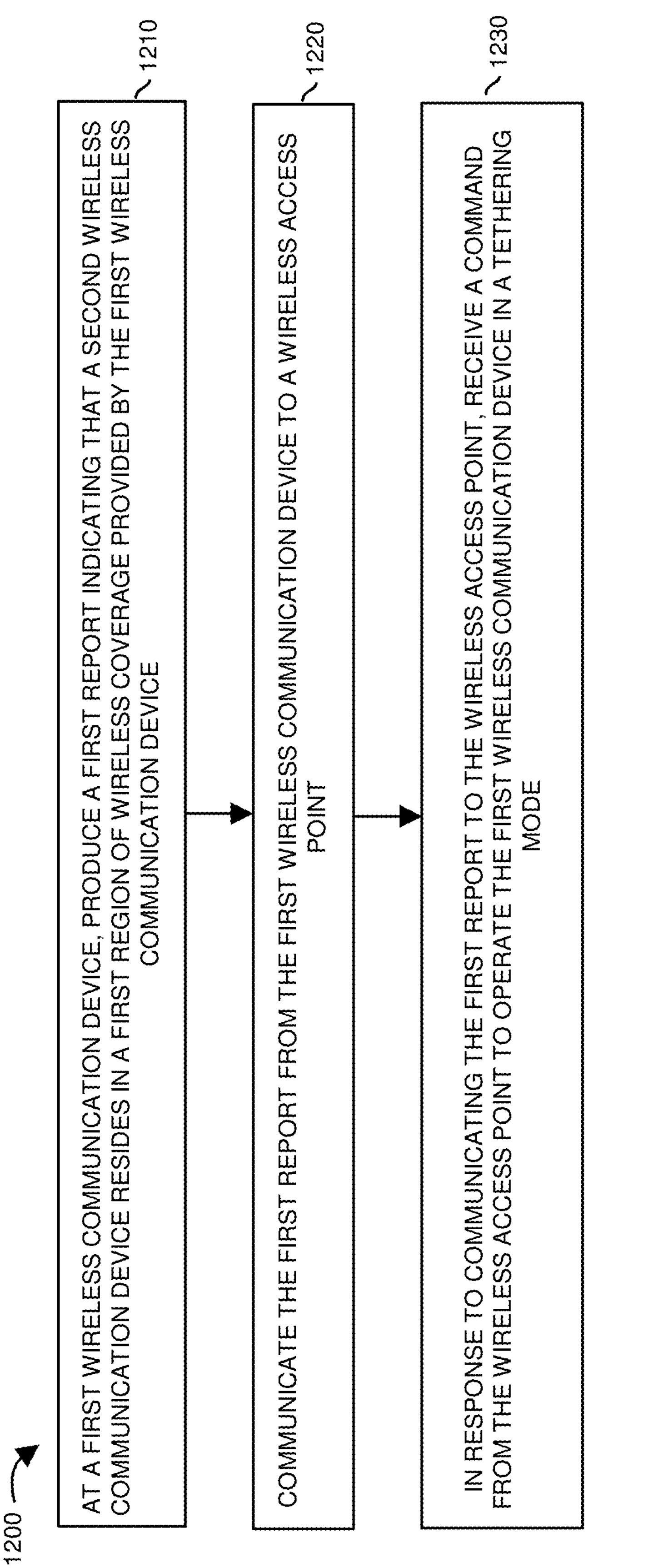
FIG. 12 is an example diagram illustrating a method as described herein.

FIG. 12 is a flowchart 1200 illustrating an example method according to embodiments. Note that there will be some overlap with respect to concepts as discussed above.

In processing operation 1210, the first mobile communication device 121 produces a report R1 indicating that the second wireless communication device 122 resides in the region of wireless coverage 152 provided by the first mobile communication device 121.

In processing operation 1220, the mobile communication device 121 communicates the report R1 from the mobile communication device 121 to the wireless access point 131 and corresponding communication management resource 141.

In processing operation 1230, in response to communicating the first report R1 to the wireless access point 131 and corresponding communication management resource 141, the mobile communication device 121 receives a command from the wireless access point 131 to operate the first wireless communication device 121 in a tethering mode to provide the mobile communication device 122 wireless access to the remote network 190.

Note again that techniques herein are well suited to facilitate control of tethering in a wireless network. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing." "computing." "calculating." "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

I claim:

1. A method comprising:

at a wireless access point, receiving a first report from a first wireless communication device residing in a first region of wireless coverage provided by the wireless access point;

via the first report, detecting a condition in which a second communication device resides within a second region of wireless coverage provided by the first wireless communication device; and in response to detecting that the second wireless communication device resides outside the first region of wireless coverage and within the second region of wireless coverage, notifying the first wireless communication device to operate in a tethering mode.

2. The method as in claim 1, wherein operation of the first wireless communication device in the tethering mode includes the first wireless communication device providing the second wireless communication device connectivity through the first wireless communication device to the wireless access point.

3. The method as in claim 1 further comprising:

via a first wireless communication link established between the wireless access point and the first wireless communication device, providing the second wireless communication device access to a remote network.

4. The method as in claim 3 further comprising:

transmitting an encapsulated wireless communication from the wireless access point over the first wireless communication link to the first wireless communication device, the encapsulated wireless communication including a first data packet targeted for delivery to the second wireless communication device, the encapsulated wireless communication including first network address information to deliver the encapsulated wireless communication from the wireless access point to the first wireless communication device.

5. The method as in claim 1, wherein the first report indicates a wireless power level at which the first wireless communication device receives a wireless signal transmitted from the second wireless communication device.

6. The method as in claim 5 further comprising:

comparing the wireless power level of the wireless signal to a wireless power threshold level; and notifying the first wireless communication device to operate in the tethering mode based at least in part in response to detecting that the wireless power level is greater than the wireless power threshold level.

7. The method as in claim 1 further comprising:

communicating an identity of a wireless network supported by the wireless access point to the first wireless communication device; and wherein the first wireless communication device is operative to wirelessly transmit the identity of the wireless network in a wireless communication to the second wireless communication device.

8. The method as in claim 1, wherein the first report received from the first wireless communication device includes a unique identifier value assigned to the second wireless communication device, the method further comprising:

via the unique identifier value assigned to the second wireless communication device, verifying that the second wireless communication device is entitled to use wireless services provided by the wireless access point.

9. The method as in claim 1 further comprising:

receiving a unique identifier value assigned to the second wireless communication device via a communication received from the first wireless communication device; and notifying the first wireless communication device to operate in the tethering mode based at least in part on detecting that the second wireless communication device belongs to a wireless network supported by the wireless access point based on the received unique identifier value.

10. The method as in claim 1 further comprising:

in response to detecting movement of the second wireless communication device into the first region of wireless coverage provided by the wireless access point, initiating a handoff of the second wireless communication device from the first wireless communication device to the wireless access point.

11. A system comprising:

communication management hardware associated with a wireless access point, the communication management hardware operative to:

receive a first report from a wireless communication device residing in a first region of wireless coverage provided by the wireless access point;

via the first report, detect a condition in which a second communication device resides within a second region of wireless coverage provided by the first wireless communication device; and in response to detecting that the second wireless communication device resides outside the first region of wireless coverage and within the second region of wireless coverage, notify the first wireless communication device to operate in a tethering mode.

12. The system as in claim 11, wherein operation of the first wireless communication device in the tethering mode includes the first wireless communication device providing the second wireless communication device connectivity through the first wireless communication device to the wireless access point.

13. The system as in claim 11, wherein the communication management hardware is further operative to:

via a first wireless communication link established between the wireless access point and the first wireless communication device, provide the second wireless communication device access to a remote network.

14. The system as in claim 13, wherein the communication management hardware is further operative to:

transmit an encapsulated wireless communication from the wireless access point over the first wireless communication link to the first wireless communication device, the wireless communication including a first data packet targeted for delivery to the second wireless communication device, the encapsulated wireless communication including first network address information to deliver the encapsulated wireless communication to the first wireless communication device.

15. The system as in claim 11, wherein the first report indicates a wireless power level at which the first wireless communication device receives a wireless signal from the second wireless communication device.

16. The system as in claim 15, wherein the communication management hardware is further operative to:

compare the wireless power level of the wireless signal to a wireless power threshold level; and notify the first wireless communication device to operate in the tethering mode based at least in part in response to detecting that the wireless power level is greater than the wireless power threshold level.

17. The system as in claim 11, wherein the communication management hardware is further operative to:

receive a unique identifier value assigned to the second wireless communication device; and notify the first wireless communication device to operate in the tethering mode based at least in part on detecting that the second wireless communication device belongs to a wireless network supported by the wireless access point based on the received unique identifier value.

18. Computer-readable storage hardware having instructions stored thereon, the instructions, when carried out by computer processor hardware, cause the computer processor hardware to:

receive a first report from a first wireless communication device residing in a first region of wireless coverage provided by the wireless access point;

via the first report, detect a condition in which a second communication device resides within a second region of wireless coverage provided by the first wireless communication device; and in response to detecting that the second wireless communication device resides outside the first region of wireless coverage and within the second region of wireless coverage, notify the first wireless communication device to operate in a tethering mode.

19. A method comprising:

at a first wireless communication device, producing a first report indicating that a second wireless communication device resides in a first region of wireless coverage provided by the first wireless communication device;

communicating the first report from the first wireless communication device to a wireless access point; and in response to communicating the first report to the wireless access point, and in response to a determination that the second wireless communication device resides outside a second region of wireless coverage provided by the wireless access point, receiving a command from the wireless access point to operate the first wireless communication device in a tethering mode.

20. The method as in claim 19 further comprising:

via operation of the first wireless communication device in the tethering mode as indicated by the received command, providing the second wireless communication device connectivity through the first wireless communication device to the wireless access point.

21. The method as in claim 19 further comprising:

receiving the command at the first wireless communication device to operate in the tethering mode based at least in part in response to a condition in which the second wireless communication device is detected as residing outside the second region of wireless coverage provided by the wireless access point and inside the first region of wireless coverage provided by the first wireless communication device.

22. The method as in claim 21 further comprising:

at the first wireless communication device, producing the first report to indicate a wireless power level at which the first wireless communication device receives a wireless signal from the second wireless communication device.

23. The method as in claim 1 further comprising:

at the wireless access point, monitoring receipt of wireless signals from wireless communication devices residing in the first region of wireless coverage at the wireless access point; and based on the monitored receipt of wireless signals at the wireless access point, generating a second report indicating the wireless communication devices residing within the first region.

24. The method as in claim 23, wherein monitoring receipt of the wireless signals from the wireless communication devices residing in the first region of wireless coverage include, at the wireless access point: i) receiving a first wireless signal from the first wireless communication device, and ii) receiving a second wireless signal from a third wireless communication device; and wherein generating the second report includes generating the second report to indicate that the first wireless communication device and the third wireless communication device both reside within the first region of wireless coverage.

25. The method as in claim 24, wherein an identity of the second wireless communication device is absent from the second report as a result of the second wireless communication device residing outside the first region of wireless coverage; and wherein the detection that the second wireless communication device resides outside the first region of wireless coverage is based at least in part on absence of the identity of the second wireless communication device from being present in the second report.

26. The method as in claim 1, wherein the tethering mode includes the first wireless communication device supporting conveyance of wirelessly transmitted data between the wireless access point and the second wireless communication device, the method further comprising:

notifying the first wireless communication device to operate in the tethering mode based at least in part in response to detecting that the first wireless communication device receives wireless signals from the second wireless communication device at a higher signal level than a third wireless communication device in the first region of wireless coverage receiving the wireless signals from the second wireless communication device.

27. The method as in claim 26 further comprising:

notifying the first wireless communication device to operate in the tethering mode based at least in part in response to detecting that the first wireless communication device receives the wireless signals from the second wireless communication device at a signal strength greater than a threshold level.

28. The method as in claim 1, wherein the first report indicates an identity of the second wireless communication device, the method further comprising:

at the wireless access point, determining from the identity of the second wireless communication device that the second wireless communication device subscribes to use of a wireless network provided by the wireless access point.

29. The method as in claim 28 further comprising:

notifying the first wireless communication device to operate in the tethering mode based at least in part in response to detecting that the second wireless communication device subscribes to the use of the wireless network provided by the wireless access point.

30. The method as in claim 29, wherein the first report indicates a wireless signal strength of the first wireless communication device receiving wireless signals from the second wireless communication device, the method further comprising:

comparing the wireless signal strength to a threshold level; and notifying the first wireless communication device to operate in the tethering mode based at least in part in response to detecting that the signal strength is greater than the threshold level.

31. The method as in claim 1, wherein the first report indicates a first wireless signal strength of the first wireless communication device receiving first wireless signals transmitted from the second wireless communication device, the method further comprising:

at the wireless access point, receiving a second report from a third wireless communication device residing in the first region of wireless coverage, the third wireless communication device in communication with the wireless access point, the second report indicating a second wireless signal strength of the third wireless communication device receiving second wireless signals transmitted from the second wireless communication device; and utilizing the first wireless signal strength and the second wireless signal strength to select the first wireless communication device to operate in the tethering mode.

32. The method as in claim 31, wherein utilizing the first wireless signal strength and the second wireless signal strength to select the first wireless communication device to operate in the tethering mode includes:

selecting the first wireless communication device to operate in the tethering mode in response to detecting that the first wireless signal strength is greater than the second wireless signal strength.

* * * * *